United States Patent
Perrin et al.

(10) Patent No.: US 12,145,406 B2
(45) Date of Patent: Nov. 19, 2024

(54) TIRE FOR AN AGRICULTURAL VEHICLE, THE TIRE COMPRISING A TREAD

(71) Applicant: COMPAGNIE GENERALE DES ETABLISSEMENTS MICHELIN, Clermont-Ferrand (FR)

(72) Inventors: Frédéric Perrin, Clermont-Ferrand (FR); David Dean, Clermont-Ferrand (FR); Johan Ferri, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 308 days.

(21) Appl. No.: 17/599,139

(22) PCT Filed: Mar. 26, 2020

(86) PCT No.: PCT/EP2020/058603
§ 371 (c)(1),
(2) Date: Sep. 28, 2021

(87) PCT Pub. No.: WO2020/201027
PCT Pub. Date: Oct. 8, 2020

(65) Prior Publication Data
US 2022/0169080 A1 Jun. 2, 2022

(30) Foreign Application Priority Data
Mar. 29, 2019 (FR) .................................... 1903413

(51) Int. Cl.
*B60C 11/01* (2006.01)
*B60C 11/03* (2006.01)
*B60C 13/02* (2006.01)

(52) U.S. Cl.
CPC .......... *B60C 11/01* (2013.01); *B60C 11/0302* (2013.01); *B60C 11/0311* (2013.01);
(Continued)

(58) Field of Classification Search
CPC . B60C 11/01; B60C 11/0302; B60C 11/0311; B60C 2011/013;
(Continued)

(56) References Cited

U.S. PATENT DOCUMENTS 1,757,754 A * 5/1930 Waterfall ................ B60C 11/01
152/154
3,568,747 A * 3/1971 Fletcher .................. B60C 13/00
244/103 S (Continued)

FOREIGN PATENT DOCUMENTS

DE 102008007548 A1 * 8/2009 ............. B60C 11/00
EP 2 141 031 1/2010
(Continued)

OTHER PUBLICATIONS

Fukuoka T, JP-2012051478-A, machine translation. (Year: 2012).*
Behr U, DE-102008007548-A1, machine translation. (Year: 2009).*

*Primary Examiner* — Sedef E Paquette
(74) *Attorney, Agent, or Firm* — Cozen O'Connor

(57) ABSTRACT

A tire for an agricultural vehicle, having a tread made of rubbery material and two axially outer zones delimiting the tread, each having a shoulder and a sidewall and designed to mechanically connect the tread to a rim. The tire has a plurality of blocks distributed in a circumferential direction (X), each block having a length L, measured in the circumferential direction (X) from a lateral face of the block, and a height H, where L is greater than H. Each block has a cavity that opens onto the lateral face, forming an opening in the lateral face. The cavity has a depth p and an opening width l. The blocks are present in at least one of the two (Continued)

axially outer zones, but not in the tread. The blocks are present at the shoulder in the continuation of the tread.

14 Claims, 7 Drawing Sheets

(52) U.S. Cl.
CPC ...... *B60C 13/02* (2013.01); *B60C 2011/0313* (2013.01); *B60C 2200/08* (2013.01)

(58) Field of Classification Search
CPC ......... B60C 2011/0313; B60C 2200/06; B60C 2200/065; B60C 2200/08; B60C 2200/14; B60C 13/00; B60C 13/001; B60C 13/002; B60C 13/02; B60C 13/023
USPC .................................................. 152/209.12
See application file for complete search history.

(56) References Cited

U.S. PATENT DOCUMENTS

| | | | | |
|---|---|---|---|---|
| 4,649,976 | A | * | 3/1987 | Cherveny ........... B60C 11/0311 152/526 |
| D301,221 | S | * | 5/1989 | Tatsumi ....................... D12/544 |
| 5,464,050 | A | * | 11/1995 | Bonko .................. B60C 11/033 152/209.12 |
| 2008/0223495 | A1 | * | 9/2008 | Ikeda ...................... B60C 11/12 152/209.16 |
| 2016/0059955 | A1 | * | 3/2016 | Yoshida .................. B64C 25/40 152/523 |
| 2016/0288578 | A1 | | 10/2016 | Harms |
| 2017/0190219 | A1 | * | 7/2017 | Iwamoto ............ B60C 11/0311 |
| 2018/0043999 | A1 | * | 2/2018 | Yoshida .................. B60C 13/02 |
| 2019/0077198 | A1 | * | 3/2019 | Nishikawa ............. B60C 13/02 |

FOREIGN PATENT DOCUMENTS

| | | | |
|---|---|---|---|
| EP | 3 150 405 | | 4/2017 |
| EP | 3 281 868 | | 2/2018 |
| JP | 2005 263055 | | 9/2005 |
| JP | 2012051478 | A * | 3/2012 |

* cited by examiner

TIRE FOR AN AGRICULTURAL VEHICLE, THE TIRE COMPRISING A TREAD

RELATED APPLICATIONS

This is a U.S. National Phase Application under 35 USC 371 of International Application PCT/EP2020/058603 filed on Mar. 26, 2020.

This application claims the priority of French application no. FR 19/03413 filed Mar. 29, 2019, the entire content of all of which is hereby incorporated by reference.

FIELD OF THE INVENTION

The present invention relates to a tire intended to equip an agricultural vehicle and, more particularly, to a tire having improved traction performance in the fields.

Although not limited to this type of application, the invention will be more particularly described with reference to a multipurpose agricultural vehicle, that is to say a vehicle that can be driven both in the fields and on roads, such as an agricultural tractor, an all-terrain vehicle (4×4, buggy), etc.

An agricultural tractor is more particularly intended to be driven on various types of ground such as the more or less compact soil of the fields, unmade tracks providing access to the fields, and the tarmacked surfaces of roads. Bearing in mind the diversity of use, in fields and on roads, the tires of an agricultural tractor need to offer a performance compromise between traction in the fields, resistance to chunking, resistance to wear on the road, rolling resistance, and vibrational comfort.

The traction performance of an agricultural tractor is particularly desired for use in the fields in which the ground is not very cohesive, such as sandy or muddy ground.

BACKGROUND OF THE INVENTION

The document US2016288578 discloses a tire for an all-terrain vehicle specifically adapted to sandy ground. This all-terrain vehicle has a tread comprising a plurality of elongate blocks in the form of a paddle, each elongate block having a curved internal face. This curved internal face is designed to move a mass of sand of the sandy ground and move the vehicle forward in response. The elongate blocks are arranged in pairs of blocks and extend obliquely over the tread. Although effective on sandy ground, such a tire is not very well suited to running on hard ground, for example on a tarmacked road. This is because the repeated contacts of the elongate blocks with such hard ground would ultimately cause premature wear or even chunking of all or some of these elongate blocks. The traction performance of a multipurpose agricultural vehicle having such tires would then be greatly reduced as a result of these elongate blocks becoming prematurely worn.

There is therefore a need to provide a tire for a multipurpose agricultural vehicle which is suited to mixed use both on ground that is not very cohesive (sandy ground, muddy ground) and on hard ground (tarmacked roads) and which maintains good resistance to wear over time.

An object of the present invention is to provide a tire for an agricultural vehicle, having improved traction capacity on ground that is not very cohesive, without having a negative effect on the other performance aspects thereof such as resistance to chunking, resistance to wear on the road, rolling resistance, and vibrational comfort.

The disclosure relates to a tire for an agricultural vehicle, comprising a tread made of rubbery material and two axially outer zones delimiting said tread. The tread is intended to come into contact with the ground while the tire is running. The axially outer zones are designed to mechanically connect the tread to a rim. Each axially outer zone comprises a sidewall and a shoulder disposed between said sidewall and the tread. The tire also comprises a plurality of blocks distributed in a circumferential direction. Each block has a length L and a height H where L>H, this length being measured in the circumferential direction from a lateral face of the block. Each block of the plurality of blocks has a cavity that opens onto the lateral face, forming an opening in this lateral face. The cavity has a depth p and an opening width l. Moreover, the blocks of the plurality of blocks are present in at least one of the two axially outer zones, said blocks not being present in the tread.

According to the invention, the blocks are present at the shoulder in the continuation of the tread.

A "tire" means all types of tread made of rubbery material subjected to an internal pressure when running.

A "rubbery material" means a diene elastomer, that is to say, in a known way, an elastomer which is based, at least partially (i.e. is a homopolymer or copolymer), on diene monomers (monomers bearing conjugated or non-conjugated carbon-carbon double bonds).

The "tread" of a tire means a quantity of rubbery material delimited by a tread surface. The tread surface groups together all the points of the tire that will come into contact with the ground under normal running conditions. For a tire, the "normal running conditions" are the use conditions defined by the ETRTO (European Tire and Rim Technical Organisation) standard. These use conditions specify the reference inflation pressure corresponding to the load-bearing capacity of the tire as indicated by its load index and its speed rating. These use conditions can also be referred to as "nominal conditions" or "working conditions". By way of example for a tire for an agricultural vehicle, the normal running conditions are conditions of running in a straight line (without camber) on flat hard ground, for example a tarmacked road, at the minimum inflation pressure recommended for the load-bearing capacity indicated on the tire and at a load corresponding to 0.8 times said load-bearing capacity indicated on the tire.

The "two axially outer zones" are understood to be the zones of the tire that delimit the tread and are designed to mechanically connect said tread to a rim. Each axially outer zone comprises a shoulder and a sidewall.

A "shoulder" means a part of the tire that continues the tread of said tire as far as the sidewall. The shoulder of the tire does not come into contact with the ground under normal running conditions on hard ground, for example on a tarmacked road. However, the shoulder of the tire can be acted upon when running, in particular on ground that is not very cohesive (sandy ground, muddy ground).

A "sidewall" means a lateral part of the tire that continues the shoulder as far as a bead. The bead is intended to receive a rim flange of a wheel.

A "radial direction" means a direction that is perpendicular to the axis of rotation of the tire.

An "axial direction" means a direction parallel to the axis of rotation of the tire.

A "circumferential direction" means a direction that is tangential to any circle centred on the axis of rotation. This direction is perpendicular both to the axial direction and to the radial direction.

When running on hard ground (tarmacked ground), it is the tread of the tire that is made to come into contact with this ground. On ground that is not very cohesive (sandy ground, muddy ground), the shoulder of the tire and a part of the sidewall are acted upon on account of the tire sinking into this ground. By providing blocks in the axially outer zones, better operation of the tire on ground that is less cohesive can be ensured. This is because the cavities of the blocks, on taking in sand or mud, compact these materials by virtue of the rotational movement of the tire generated by the transmission of the vehicle. This results in the creation of a ground resistance force, allowing the vehicle to move forward. Since the blocks do not extend over the tread of the tire, they are not acted upon, or are acted upon little, when running on hard ground. These blocks thus become worn in a controlled manner and their use on ground that is not very cohesive is maintained over time.

Preferably, the blocks extend over the sidewall.

Preferably, the length L of the block is determined such that L>1.3*H.

Preferably, the depth p of the cavity is greater than or equal to 15% of the opening width l of said cavity.

Preferably, the area of the opening of the cavity onto the lateral face is greater than or equal to 30% of the area of said lateral face.

Preferably, the area of the opening of the cavity onto the lateral face is less than or equal to 90% of the area of said lateral face.

In one embodiment variant, in a cross-sectional view, the cavity has a concave shape. This cross-sectional view is, in this case, a circumferential cross-sectional view taken in a section plane that extends in a radial direction and along the length of the block. This section plane separates the block into, for example, two ½ blocks.

In another embodiment variant, in a cross-sectional view, the cavity has a rectilinear bottom, said bottom being inclined with respect to a radial direction.

Preferably, the lateral face is inclined with respect to a radial direction.

Preferably, the opening of the cavity extends over at least 80% of the height H of the lateral face.

Preferably, the blocks of the plurality of blocks are formed integrally with the axially outer zone(s) of said tire.

Preferably, the block has another lateral face on the opposite side from the lateral face comprising said opening, said other lateral face having another opening.

BRIEF DESCRIPTION OF THE DRAWINGS

The present invention will be understood better upon reading the detailed description of embodiments that are given by way of entirely non-limiting examples and are illustrated by the appended drawings, in which.

DETAILED DESCRIPTION OF THE DRAWINGS

The invention is not limited to the embodiments and variants presented and other embodiments and variants will become clearly apparent to a person skilled in the art.

Figure 1:
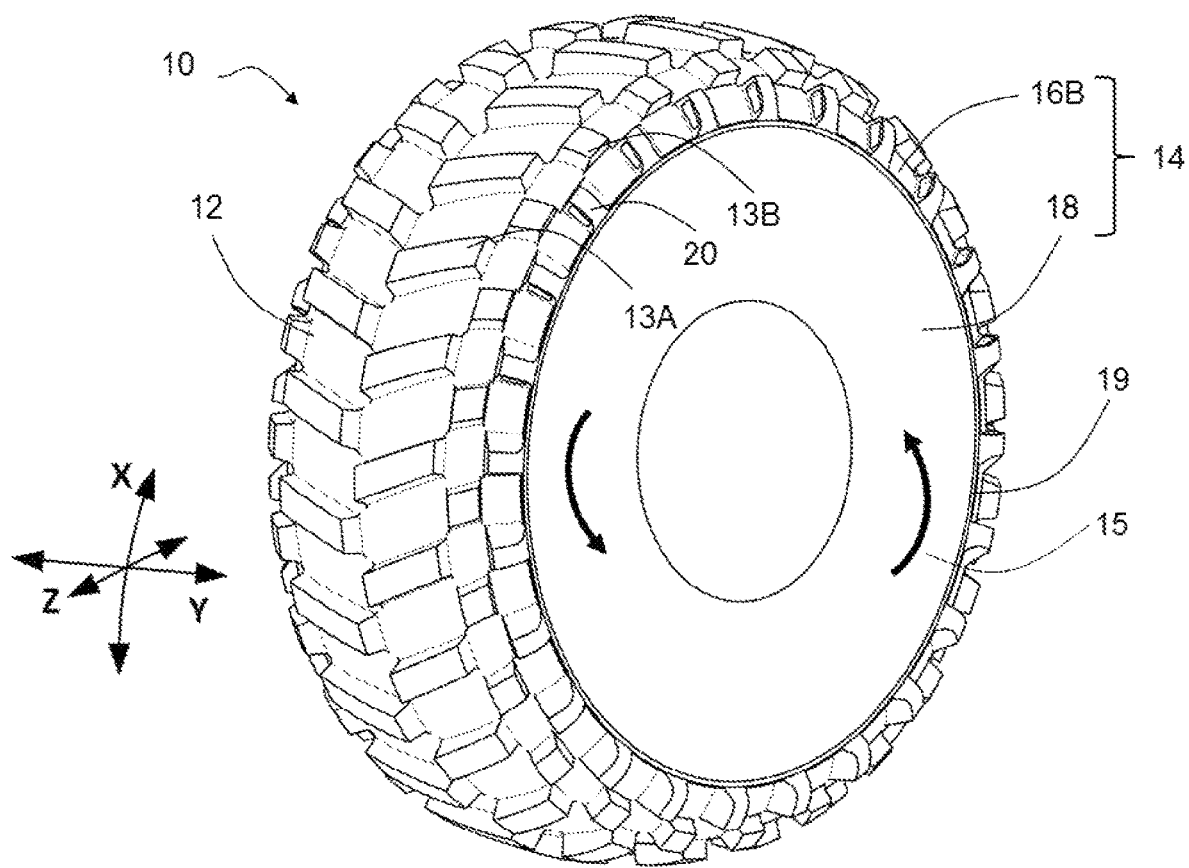
FIG. 1 is a perspective view showing a tire for an agricultural vehicle according to the invention.

FIG. 1 shows a tire 1 intended to be fitted to a driven axle of an agricultural vehicle. In the example of the embodiment in FIG. 1, this tire 1 is a radial tire comprising a reinforcement (not shown) made up of a crown reinforcement radially on the inside of the tread and of a carcass reinforcement radially on the inside of the crown reinforcement.

The crown reinforcement of a radial tire for an agricultural vehicle comprises a superposition of crown layers extending circumferentially (in the X direction), radially (in the Z direction) on the outside of the carcass reinforcement. Each crown layer is made up of reinforcers that are coated in an elastomer compound and are mutually parallel. The crown layer reinforcers may be made up of textile polymer materials, such as a polyester, for example a polyethylene terephthalate (PET), an aliphatic polyamide, for example a nylon, an aromatic polyamide, for example aramid, or rayon, or may be made up of metal materials such as steel.

The carcass reinforcement of a radial tire for a motor vehicle comprises at least one carcass layer connecting two beads to one another. A carcass layer comprises reinforcers coated in a polymer material containing an elastomer, obtained by blending, or elastomer compound. The carcass layer reinforcers are usually made up of textile polymer materials, such as a polyester, for example a polyethylene terephthalate (PET), an aliphatic polyamide, for example a nylon, an aromatic polyamide, for example aramid, or rayon. The reinforcers of a carcass layer are substantially mutually parallel and form an angle of between 85° and 95° with the circumferential direction (X direction).

Figure 3:
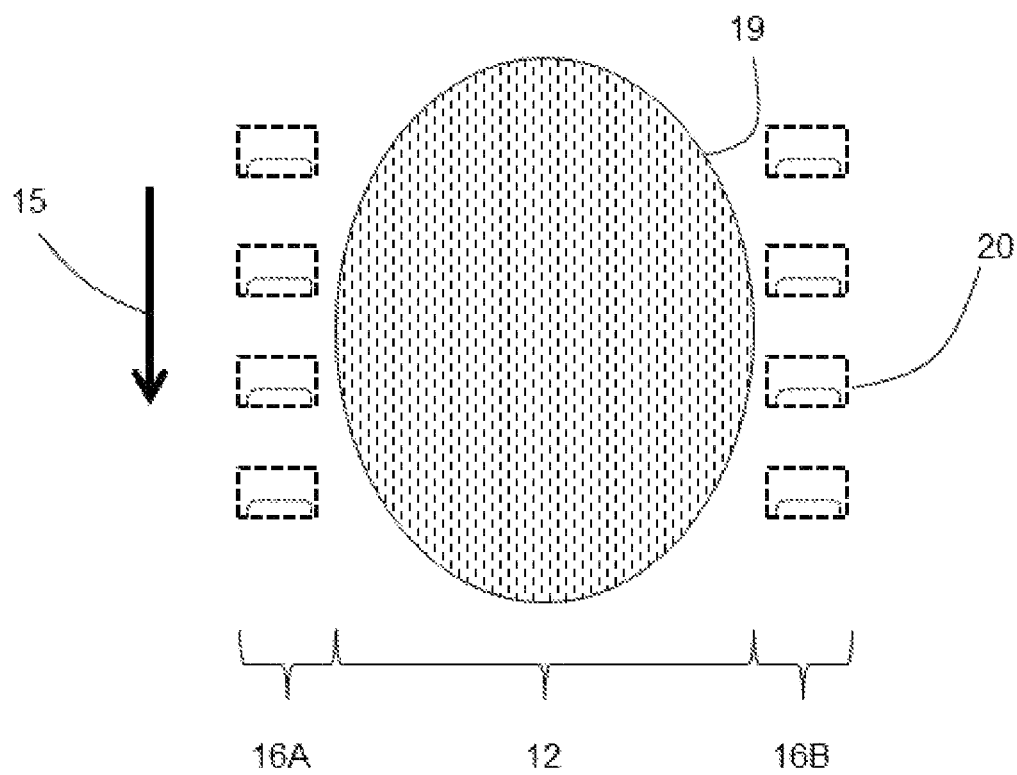
FIG. 3 is a schematic view of a part of the tire in FIG. 1 under normal running conditions.

The tire 10 in FIG. 1 also comprises a tread 12 made of rubbery material and two axially outer zones 14 delimiting said tread 12, only one of which is shown in its entirety here in FIG. 1. The tread 12 is intended to come into contact with the ground while the tire 10 is running. Under normal running conditions on hard ground, for example on a tarmacked road, the tread 12 forms, with the ground, a contact patch 19 illustrated in FIG. 3. The contact patch 19 groups together all the points of the tread 12 in contact with the ground at a given moment under normal running conditions. As already specified above, the normal running conditions are understood to be conditions of running in a straight line on hard ground, for example a tarmacked road, at the minimum inflation pressure recommended for the load-bearing capacity indicated on the tire and at a load corresponding to 0.8 times said load-bearing capacity indicated on the tire. By way of example, for a tire for an agricultural vehicle of the Michelin brand having the following elements as marking: 600/70R30 165D TL, the load index 165 corresponds to a load-bearing capacity of 5150 kg and a recommended minimum inflation pressure for this load of 1.6 bar. The contact patch 19 in FIG. 3 is formed by compression on the rigid ground at a pressure of 1.6 bar and at the load of 4120 kg (5150*0.8). The set of contact patches 19 determined at different times during rolling form a tread surface of the tread 12.

The tread 12 of the tire 1 comprises a plurality of raised elements 13A, 13B, known as blocks, extending radially (Z direction) towards the outside from a bearing surface as far as the tread surface. The tread 12 in FIG. 1 thus comprises a plurality of first blocks 13A in the form of generally parallelepipedal elongate lugs. These first blocks 13A are organized in two series of first blocks 13A disposed on either side of a central part of the tread 12. These two series of first blocks 13A are offset from one another in the circumferential direction (X direction). The tread 12 also comprises a plurality of second blocks 13B. These second blocks 13B are disposed axially further towards the outside with respect to the first blocks 13A and between two adjacent blocks 13A. Thus, each first block 13A extends over only a part of the ½ width of the tread 12. However, the first blocks 13A and the second blocks 13B add together in the axial direction (Y direction) to stiffen the tread 12 across its entire width. The decoupling between the first blocks 13A and the second blocks 13B makes it possible to improve the flattening of the tread 12 when running.

Figure 2:
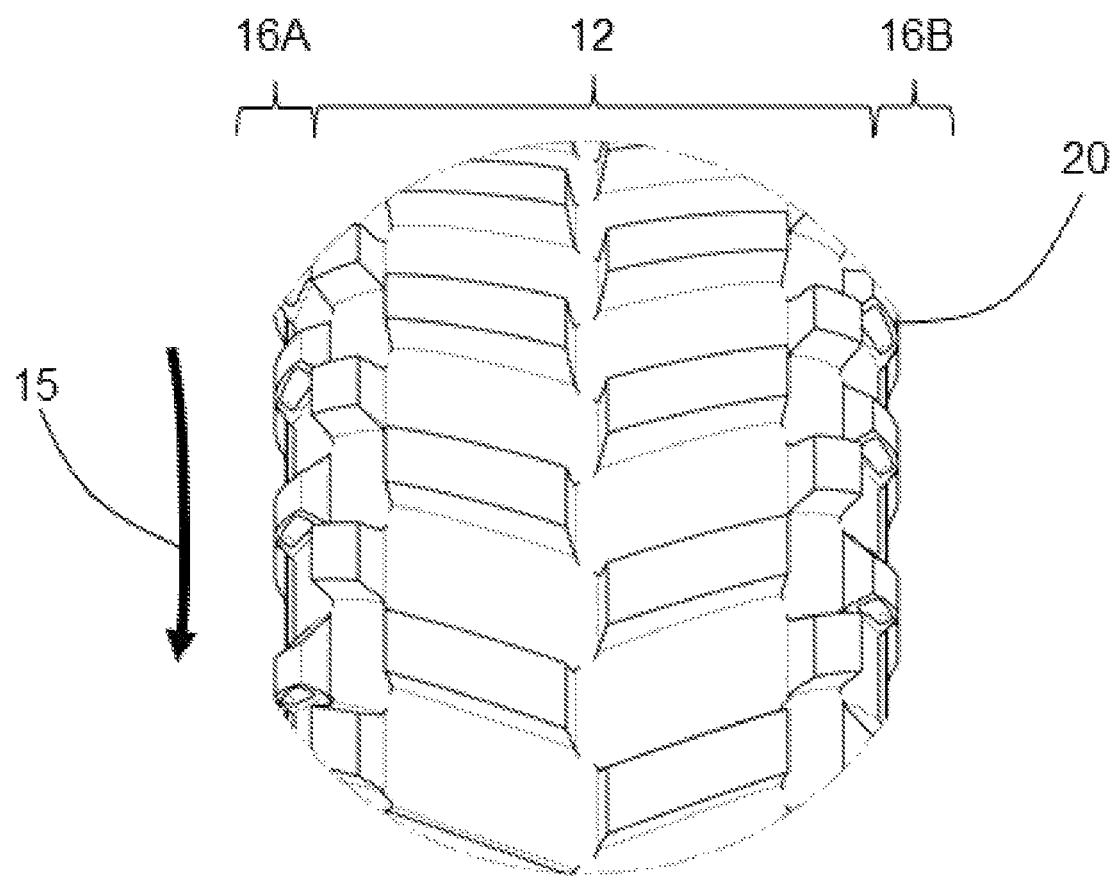
FIG. 2 is a detail view of a part of the tire in FIG. 1.

The tread 10 in FIG. 1 also comprises two axially outer zones 14, only one of which is shown here. The two axially outer zones 14 delimit the tread 12 and are designed to mechanically connect the tire 10 to a rim (not shown). Each axially outer zone 14 comprises a sidewall 18 and a shoulder 16A, 16B disposed between said sidewall 18 and the tread 12. A shoulder 16A, 16B continues the tread 12, as is shown in FIG. 2. Each sidewall 18 comprises, at its end, a flange 19 designed to be connected to a rim. At least one axially outer zone 14 comprises a plurality of third blocks 20 distributed in a circumferential direction. These third blocks 20 are therefore offset axially with respect to the first blocks 13A and to the second blocks 13B and are aligned or not aligned axially with the first blocks 13A and/or the second blocks 13B. As is illustrated in FIG. 3, the third blocks 20 are not in the contact patch 19 under the normal running conditions, since they are not present in the tread 12 but in the shoulder 16A, 16B continuing the tread 12. Thus, when running on hard ground, the third blocks 20 do not come into contact with this ground. The level of wear of these third blocks 20 is thus limited.

Preferably, the third blocks 20 of the plurality of blocks are formed integrally with the axially outer zone(s) 14 of said tire. This means that the blocks 20 and the axially outer zones 14 are made from one and the same material. These third blocks 20 can thus be obtained during one and the same moulding operation as the rest of the tire.

Figure 4:
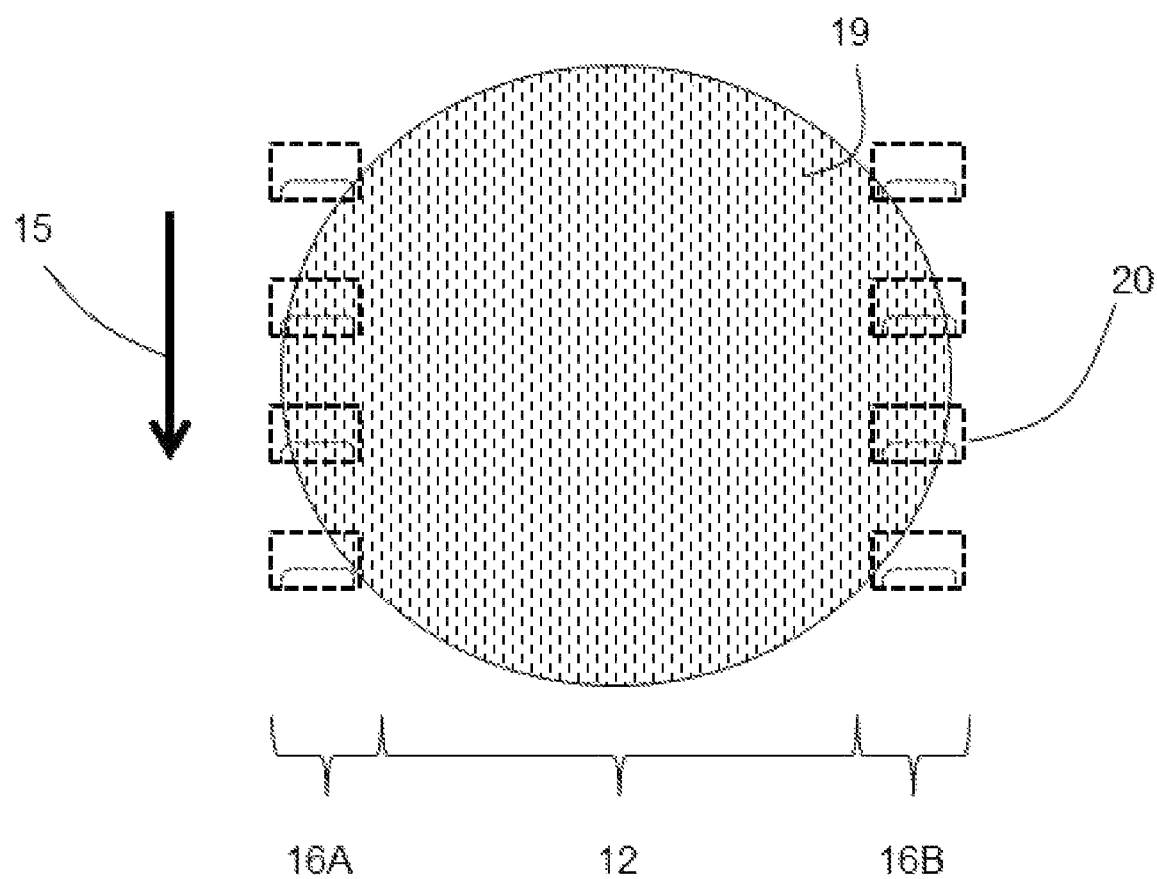
FIG. 4 is a schematic view of a part of the tire in FIG. 1 when running on ground that is not very cohesive.
Figure 5:
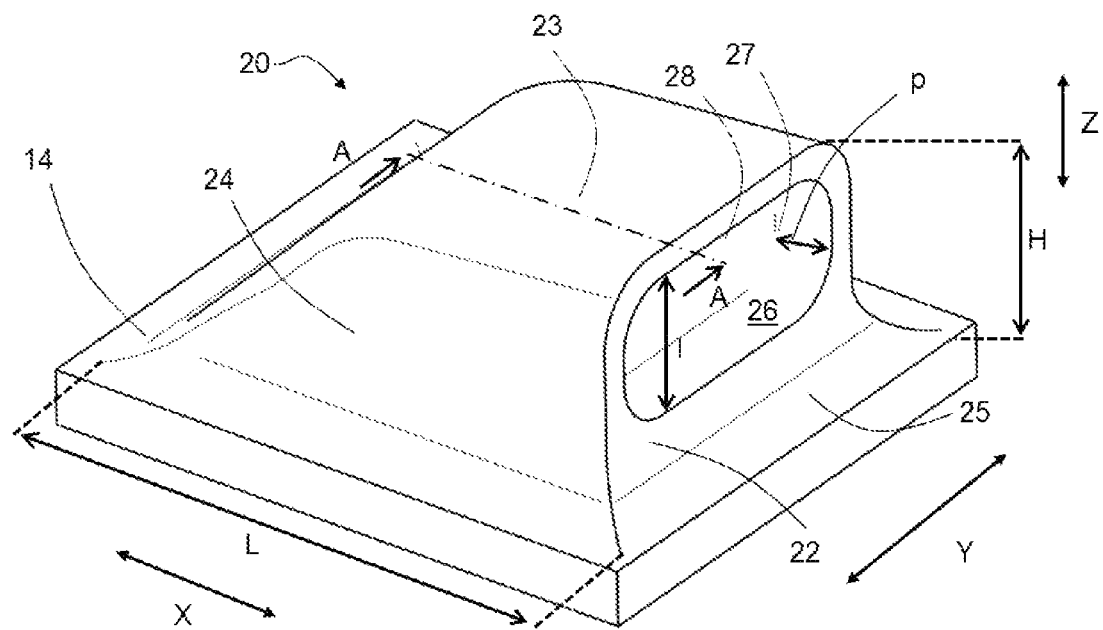
FIG. 5 is a perspective view showing a block of the tire in FIG. 1.
Figure 6:
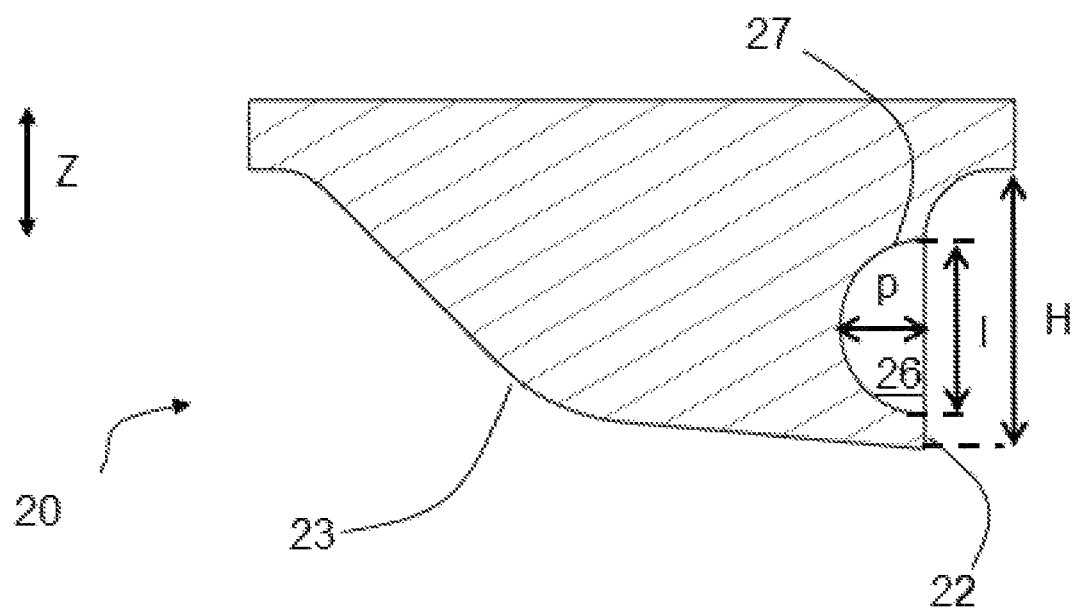
FIG. 6 is a cross-sectional view on A-A of the block in FIG. 5.

FIG. 5 is a perspective view of a third block 20 of the axially outer zone 14. This third block 20 is present in the shoulder 16A, 16B of the tire 10. As a variant, the third block 20 also extends over the sidewall 18. The third block 20 in this case comprises a first lateral face 22 extending across the width of the third block 20 (in the Y direction) and two second lateral faces 24 (only one of which is shown here) extending perpendicularly to the first lateral face 22 along the length L of the third block 20. The first lateral face 22 and the second lateral faces 24 are connected by a curved external face 23. The external face 23 extends from the first lateral face 22, starting from a height H, as far as the axially external zone 14 of zero height. The height H corresponds here to the maximum height of the third block 20 measured in a radial direction Z. The length L corresponds to the maximum extension length of the second lateral faces 24 measured in the circumferential direction X from the first lateral face 22. The length L of the block is in this case much greater than the height H. In a preferred embodiment, the length L of the third block 20 is determined such that the length L is more than 1.3 times the height H of the block 20. As is illustrated in FIGS. 5 and 6, the third block 20 comprises a cavity 26 opening onto the first lateral face 22, forming an opening 28 onto this first lateral face 22. The cavity 26 has a bottom 27 and a depth p measured between said bottom 27 and the first lateral face 22 in the circumferential direction X. This depth p corresponds to the maximum depth of the cavity 26. The cavity 26 also has an opening width l measured in the radial direction Z. This opening width l corresponds to the maximum width of the cavity 26. The cavity 26 is intended to store material (mud, sand). This cavity 26 is in particular active when the tire runs in the running direction 15 illustrated in FIGS. 1 to 4. In this running direction 15, the first lateral face 22 is a leading face and the external face 23, in its part inclined towards the axially outer zone 14, is a trailing face. The leading face is the first to enter the contact patch 19 and the trailing face is the last to leave said contact patch 19.

FIG. 4 schematically illustrates a contact patch 19 of the tire when running on ground that is not very cohesive. Since the tire 10 tends to sink into this type of ground, the contact patch 19 is more extensive. Hence, the third blocks 20 at least partially enter this contact patch 19 and thus become active to store material (mud, sand) during running. Preferably, the area of the opening 28 of the cavity 26 onto the lateral face 22 is greater than or equal to 30% of the area of this lateral face 22. In this way, the cavities 26 in the third blocks 20 are acted upon rapidly as soon as they enter the contact patch 19. In FIG. 5, the cavity 26 is generally centred on the first lateral face 22.

Preferably, the area of the opening 28 of the cavity 26 onto the lateral face 22 is less than or equal to 90% of the area of said lateral face 22. This ensures that the material elements surrounding the opening 28 of the cavity 26 are sufficient to ensure that the third block 20 exhibits minimum stiffness when it enters the contact patch 19. It will also be noted that the third block 20 comprises a connecting part 25 continuing the lateral face 22. This connecting part 25 has a curved shape. It is intended to anchor the third block 20 to the axially outer zone 14.

Preferably, the depth p of the cavity 26 is greater than or equal to 15% of the opening width l of said cavity 26. This ensures a good capacity of the cavity 26 to store the sand or mud in order to move the vehicle forward.

FIG. 6 illustrates more particularly an embodiment in which the cavity 26 has, in cross-sectional view, a concave shape.

Figure 7A:
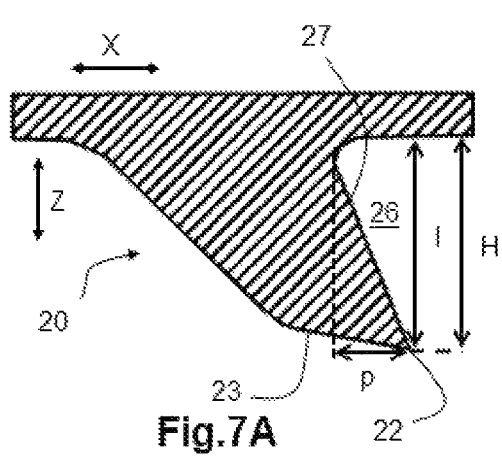
FIGS. 7A-7F are schematic cross-sectional views of the block in FIG. 5, according to different embodiments of the invention.
Figure 7B:
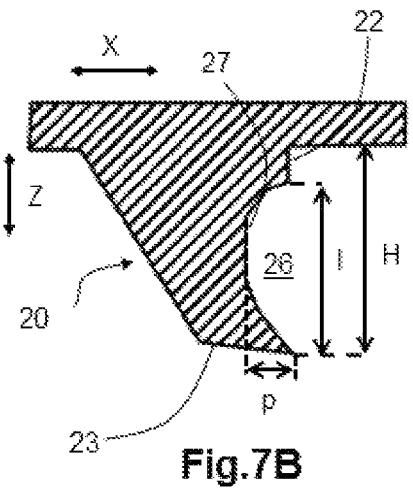
Figure 7C:
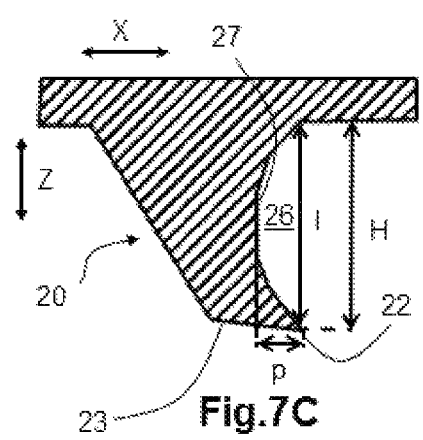
Figure 7D:
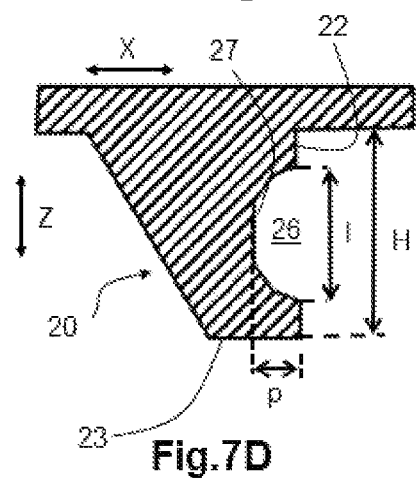
Figure 7E:
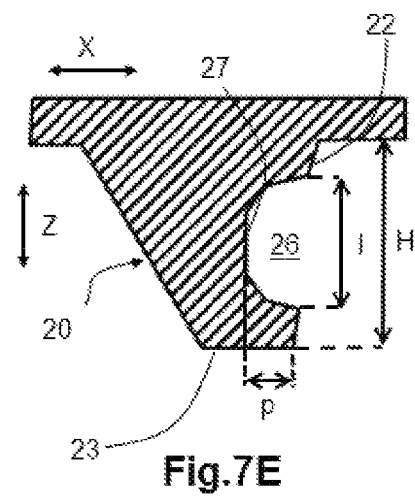
Figure 7F:
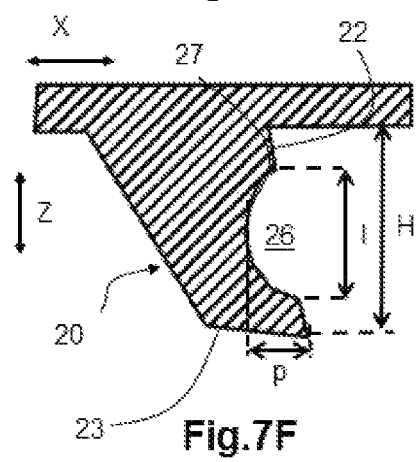

FIGS. 7A-7F illustrate embodiment variants of this cavity 26. In FIG. 7A, the cavity 26 has a rectilinear bottom 27. This bottom 27 is inclined with respect to the radial direction Z. This inclination is for example around 45° with respect to said radial direction. FIGS. 7B-7F illustrate variants in which the cavity 26 has a concave shape. More particularly, in FIG. 7B, the cavity 26 extends partially over the height H of the third block 20. This cavity 26 is offset towards the external face 23. In FIG. 7C, the cavity 26 extends over the entire height H of the third block 20. In FIGS. 7D and 7E, the external face 23 makes a zero angle with the circumferential direction X. More particularly, in FIG. 7E, the lateral face 22 is inclined with respect to the radial direction Z. In FIG. 7F, the external face 23 and the lateral face 22 are inclined with respect to the circumferential direction X and with respect to the radial direction Z, respectively.

Figure 8:
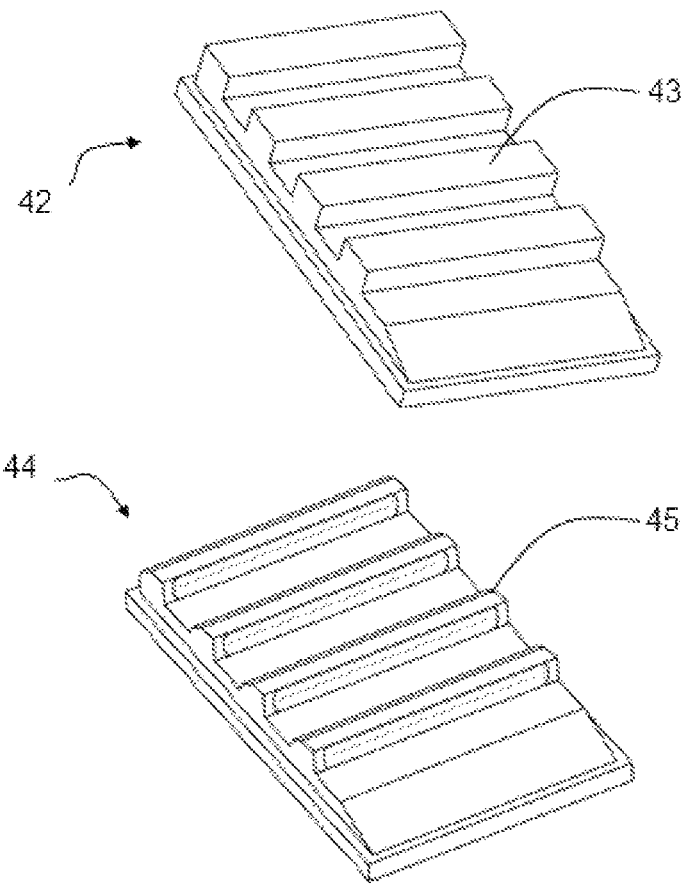
FIG. 8 schematically illustrates a reference test specimen and a working test specimen that are used to demonstrate the performance aspects of the invention.

Table 1 below illustrates the traction results of a working test specimen 44 having blocks 45 according to the invention compared with a reference test specimen 42. These test specimens 42, 44 are illustrated in FIG. 8. The reference test specimen 42 corresponds to a rubber strip having a plurality of lugs 43. These lugs 43 are in the form of parallelepipeds having a generally rectangular section. The working test specimen 44 has a plurality of blocks 45 shaped like the block in FIG. 7C. As has already been mentioned, the block in FIG. 7C has a cavity 26 which extends over the entire height H of the block. The working test specimen 44 and the reference test specimen 42 are designed to pass into a sample of ground which reproduces the characteristics of ground that is not very cohesive, and these test specimens 42, 44 are made to slip with respect to this ground sample. By way of example, the ground sample comprises clayey soil that is weakly compacted (0.5 bar) and with a very high moisture content, that is to say virtually water saturated (42% moisture content). Table 1 illustrates the performance aspects of the working test specimen 44 compared with the reference test specimen 42 at different rates of slip:

TABLE 1

| Rate of slip in % | Working test specimen performance/Reference test specimen performance |
|---|---|
| 5 | 152% |
| 7 | 151% |
| 9 | 153% |
| 11 | 149% |
| 13 | 145% |
| 15 | 143% |

Overall, the mean improvement provided by the working test specimen 44 compared with the reference test specimen 42 is 50%. These performance aspects are found, at least in part, on tires for an agricultural vehicle that have blocks in accordance with the invention on their axially outer zone(s).

Figure 9:
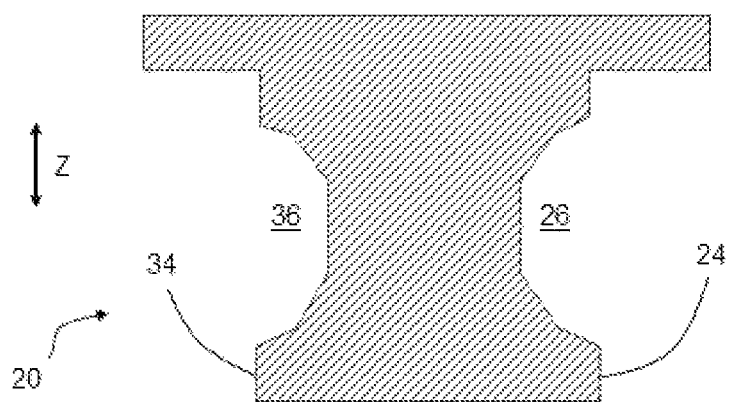
FIG. 9 is a schematic view of a cross section through the block of the tire in FIG. 1, according to another embodiment of the invention.

FIG. 9 illustrates another embodiment of a block 20 according to the invention. In this embodiment, the block 20 comprises two opposite lateral faces 24, 34 and two cavities 26, 36 that open respectively onto one of the lateral faces 24, 34. In this way, the block 20 acts both when travelling forward, that is to say in the normal direction of movement of the vehicle, and when travelling in reverse. Depending on the direction of movement, forward or in reverse, the lateral faces 24, 34 are alternatively either a leading face or a trailing face. The cavities 26, 36 are in this case identical and are shaped like the cavity in FIG. 7D. As a variant, the cavities 26 and 36 may have different shapes. All the combinations of shapes from the different embodiments in FIGS. 6 and 7A-7F are possible.

The invention is not limited to the embodiments and variants presented and other embodiments and variants will become clearly apparent to a person skilled in the art.

Thus, the tire 10 may have a single series of third blocks 20 present only on a single axially outer zone 14.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire for an agricultural vehicle, comprising:
a tread made of rubbery material configured to come into contact with the ground while the tire is running; and
two axially outer zones delimiting said tread, said axially outer zones being designed to mechanically connect said tread to a rim, each axially outer zone comprising:
a sidewall;
a shoulder disposed between said sidewall and the tread; and
a plurality of individual blocks distributed in a circumferential direction (X),
each block having a length L and a height H where L is greater than H, said length L being measured in the circumferential direction (X) from a lateral face of said block,
each individual block of the plurality of blocks having a single cavity that opens onto said lateral face, forming an opening in said lateral face, said cavity having a depth p and an opening width l,
each individual block has another lateral face on the opposite side from the lateral face comprising said opening, the other lateral face having an angle with respect to the circumferential direction that is less than an angle with respect to the circumferential direction of the lateral face comprising said opening,
each individual block having an external face configured as a plateau arranged between the other lateral face and the lateral face,
the cavity facing a rolling direction of the tire,
the blocks of the plurality of blocks being present in at least one of the two axially outer zones, said blocks not being present in the tread, and
each of the blocks are present at the shoulder in the continuation of the tread,
wherein the other lateral face is arranged at a first angle with respect to the circumferential direction (X), the lateral face arranged at a second angle with respect to the circumferential direction (X), and the plateau is arranged at a third angle with respect to the circumferential direction (X), wherein the first angle, the second angle, and the third angle are different from each other.

2. The tire according to claim 1, wherein the blocks extend over the sidewall.

3. The tire according to claim 1, wherein the length L of the block is determined such that said length L is more than 1.3 times the height H of said block.

4. The tire according to claim 1, wherein the depth p of the cavity is greater than or equal to 15% of the opening width l of said cavity.

5. The tire according to claim 1, wherein the area of the opening of the cavity onto the lateral face is greater than or equal to 30% of the area of said lateral face.

6. The tire according to claim 5, wherein the area of the opening of the cavity onto the lateral face is less than or equal to 90% of the area of said lateral face.

7. The tire according to claim 1, wherein, in a cross-sectional view, the cavity has a concave shape.

8. The tire according to claim 1, wherein, in a cross-sectional view, the cavity has a rectilinear bottom, said bottom being inclined with respect to a radial direction (Z).

9. The tire according to claim 1, wherein the lateral face is inclined with respect to a radial direction (Z).

10. The tire according to claim 1, wherein the opening of the cavity extends over at least 80% of the height H of the lateral face.

11. The tire according to claim 1, wherein the blocks of the plurality of blocks are formed integrally with the axially outer zone(s) of said tire.

12. The tire according to claim 1, wherein the block has another lateral face on the opposite side from the lateral face comprising said opening, said other lateral face having another opening.

13. The tire according to claim 1, wherein the tread comprises:
- a plurality of first blocks configured as parallelepipedal elongate lugs disposed on either side of a central part of the tread and are offset from one another in the circumferential direction; and
- a plurality of second blocks disposed axially further towards an outside with respect to the first blocks and between two adjacent first blocks.

14. The tire according to claim 1, wherein the other lateral face being uninterrupted.

* * * * *